United States Patent
Vashchenko et al.

(10) Patent No.: US 6,667,867 B2
(45) Date of Patent: *Dec. 23, 2003

(54) STABLE BJT ELECTROSTATIC DISCHARGE PROTECTION CLAMP

(75) Inventors: Vladislav Vashchenko, Fremont, CA (US); Peter J. Hopper, San Jose, CA (US)

(73) Assignee: National Semiconductor Corp., Santa Clara, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 09/767,934

(22) Filed: Jan. 23, 2001

(65) Prior Publication Data

US 2002/0097544 A1 Jul. 25, 2002

(51) Int. Cl.⁷ .................................................. H02H 9/00
(52) U.S. Cl. .......................... 361/91.1; 361/56; 361/58; 361/111

(58) Field of Search ........................... 361/91.1, 56, 58, 361/111, 127

(56) References Cited

U.S. PATENT DOCUMENTS

| | | | | |
|---|---|---|---|---|
| 5,978,192 A | * | 11/1999 | Young et al. | 361/56 |
| 6,028,758 A | * | 2/2000 | Sharpe-Geisler | 361/111 |
| 6,268,990 B1 | * | 7/2001 | Ogura et al. | 361/91.7 |
| 6,492,859 B2 | * | 12/2002 | Vashchenko et al | 327/310 |

* cited by examiner

Primary Examiner—Stephen W. Jackson
(74) Attorney, Agent, or Firm—Jurgen Vollrach

(57) ABSTRACT

In an ESD protection circuit for an analog bipolar circuit, the avalanche breakdown voltage of a BJT acting as an avalanche diode is reduced by injecting current into the base of the BJT. This is achieved through the use of a capacitor connected between $V_{dd}$ and the base of the avalanche BJT to speed up the switching of the protection circuit.

12 Claims, 3 Drawing Sheets

STABLE BJT ELECTROSTATIC DISCHARGE PROTECTION CLAMP

FIELD OF THE INVENTION

The invention relates to protection circuitry for protecting circuits against transients such as electrostatic discharge (ESD). In particular, the invention relates to circuitry for protecting analog bipolar circuits, including BJT and BIC-MOS based circuits against voltage transients.

BACKGROUND OF THE INVENTION

Analog circuits typically display sensitivity to excessive voltage levels. Transients, such as ESD can cause the voltage handling capabilities of the analog circuit to be exceeded, resulting in damage to the analog circuit. Clamps have been devised to shunt current to ground during excessive voltage peaks.

One of the difficulties encountered in designing such protection circuitry is that the specifications for these clamps have to fit within a relatively small design window that, on the one hand, takes into account the breakdown voltage of the circuit being protected. Thus, the clamp must be designed such as to be activated below the breakdown voltage of the circuit that is to be protected. At the same time, the design window is limited by the latchup phenomenon to ensure that the clamp is not conducting under normal operating conditions. The latchup voltage must exceed the normal operating voltage of the protected circuit.

Typical protection clamps employ avalanche diodes such as zener diodes to provide the bias voltage for the base of a subsequent power bipolar junction transistor (BJT). In a prior art claim comprising a reverse coupled BJT that acts as an avalanche diode, the BJT has a defined reverse breakdown. A voltage pulse supplied to the input that exceeds the breakdown voltage of the BJT, causes an avalanche effect in the BJT and results in current flow from the emitter to the collector when the reverse breakdown voltage of the BJT is exceeded. The current drives the base of a power BJT and switches the power BJT on, thus biasing the base to switch on the power BJT. Once the power BJT switches on, collector/emitter current is shunted to ground. Instead of a reverse coupled BJT, one or more zener diodes could be used instead. For example, in a five volt power supply circuit where the power BJT is a 10 volt BJT, two 3.5 volt zener diodes could be used to replace the reverse coupled BJT. Until the power BJT switches on, the voltage across the clamp, which is also the voltage applied to the protected circuit, increases during a voltage peak such as a human body discharge that may typically be 120–125% percent of the final holding voltage.

A problem with the prior art solution is the excessive time delay before BJT starts conducting. This causes an over voltage as high as 20% and more. This short term overload voltage may last for 10–30 ns., and can cause burn out or other damage to the protected circuit.

SUMMARY OF THE INVENTION

According to the invention there is provided an overvoltage protection circuit for protecting an input of an analog bipolar circuit, which comprises a first bipolar junction transistor connected between an input of the analog bipolar circuit and ground; a reverse-coupled bipolar junction transistor, wherein its emitter is connected to the input, and its collector is connected to the base of the first bipolar junction transistor, and, further comprising, a capacitor connected to the base of the reverse coupled bipolar junction transistor to inject current into the base.

The first transistor acts as a switch for shunting current to ground, while the reverse-coupled transistor serves to switch on the first transistor when the reverse breakdown voltage of the reverse-coupled transistor is exceeded. The capacitor lowers the reverse-breakdown voltage of the reverse-coupled transistor.

The first transistor and reverse-coupled transistor are preferably NPN bipolar junction transistors.

More generally, the invention provides an overvoltage protection circuit, comprising a first transistor for shunting current to ground, a reverse-coupled transistor connected to the first transistor to force the first transistor into conduction when the reverse-coupled transistor is forced into conduction, and a capacitor connected to the reverse-coupled transistor to more rapidly cause the reverse-coupled transistor to conduct. The capacitor causes the reverse-coupled transistor more rapidly to conduct by reducing the break-down voltage of the reverse-coupled transistor. This is achieved by injecting current into the base of the reverse-coupled transistor. The first transistor may be a BJT or a field effect transistor.

Further, according to the invention, there is provided a method of improving an overvoltage protection circuit for an input to a protected circuit, wherein the overvoltage protection circuit includes a first transistor for shunting current to ground, and a reverse-coupled transistor connected to the first transistor to switch on the first transistor, the method comprising the step of lowering the reverse-breakdown voltage of the reverse-coupled transistor when a voltage transient occurs.

DETAILED DESCRIPTION OF THE INVENTION

Figure 1:
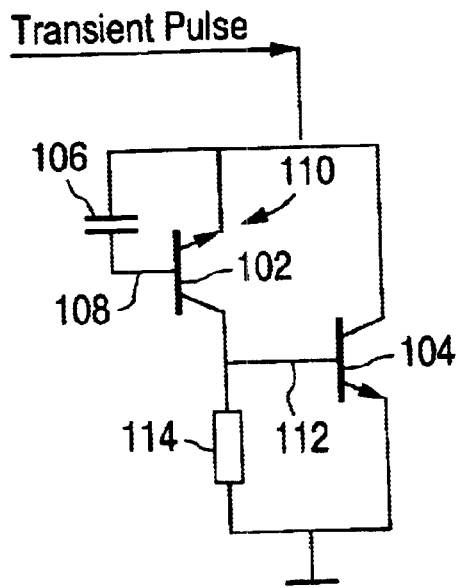
FIG. 1 is a schematic circuit diagram of one embodiment of a clamp of the present invention.

One embodiment of a protection clamp of the invention is shown in FIG. 1. The clamp 100 comprises an avalanche diode in the form of a BJT 102 and an power BJT 104. A capacitor 106 is connected between the base 108 and emitter 110 of the BJT 102. The capacitor 106 has the effect of speeding up the turning on of the avalanche BJT 102. The clamp must turn on before the breakdown voltage of the attached circuit is exceeded. In particular, it must switch on faster than the 10 ns rise time defined by the human body model (HBM). In order to achieve this, the capacitor 106 is introduced. The capacitor 106 causes faster breakdown by reducing the breakdown voltage. In fact, it presents a substantial short circuit to a voltage transient, causing current to be injected into the base of the BJT 102. The ideal capacitor size may easily be determined using TCAD simulation.

The emitter-collector current through BJT 102 is fed to the base 112 of the BJT 104 which typically is a transistor. As the current flows through the resistor 114, the base voltage of the BJT 104 rises, turning the BJT 104 on to shunt current to ground.

Figure 2:
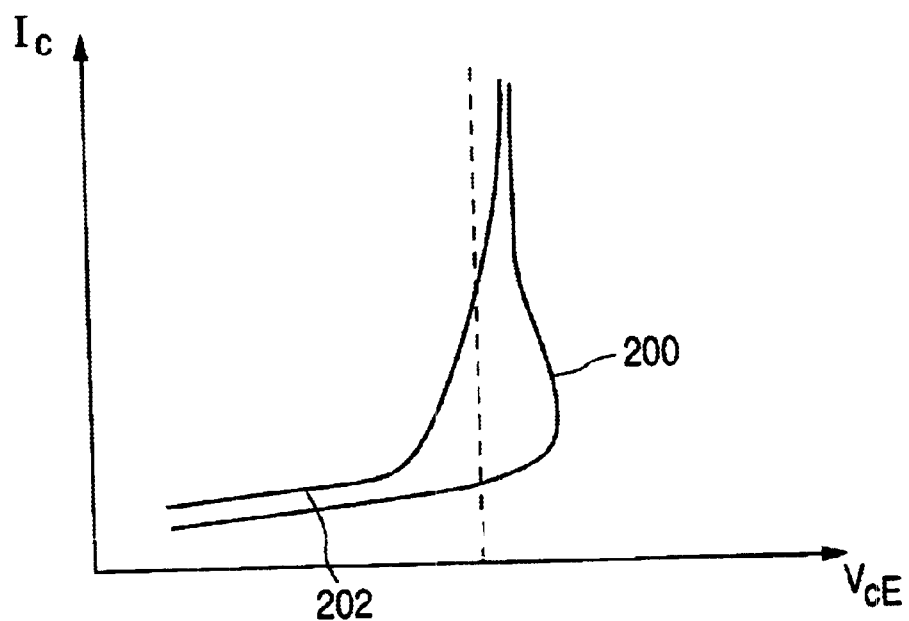
FIG. 2 is a graph showing the effect of base current on breakdown voltage of a BJT operating as an avalanche diode.

The effect of the capacitor 106 on the breakdown voltage of the avalanche diode 102 is illustrated in FIG. 2 which shows the reduction in the breakdown voltage ($V_{CE}$) as base current is added to the BJT 102. The voltage waveform 200 shows the breakdown voltage when no extra capacitance is added. The waveform 202 shows the reduction in the breakdown voltage ($V_{CE}$) when additional capacitance is added.

Figure 3:
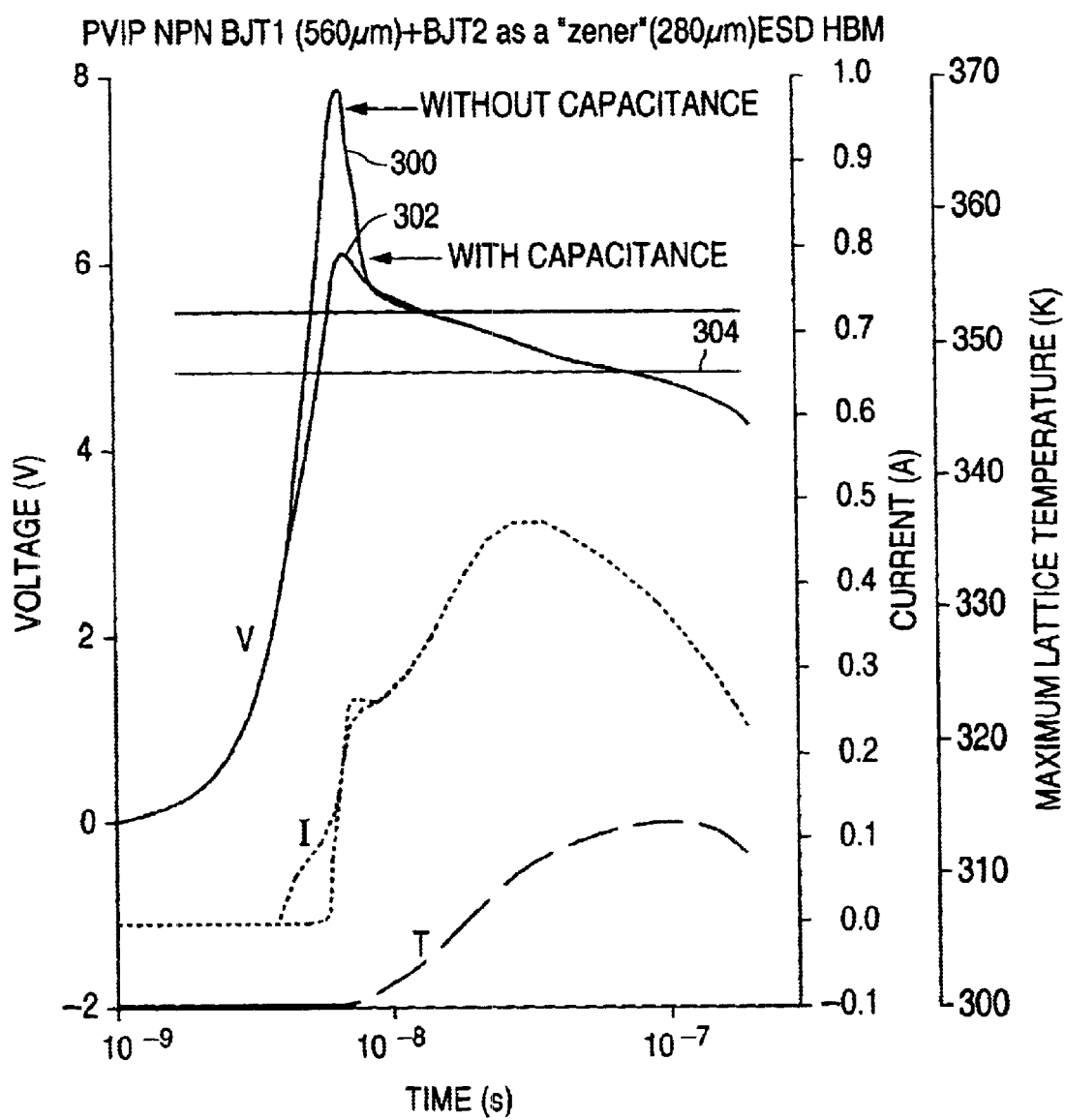
FIG. 3 shows two sets of waveforms for the voltage, current, and lattice temperature characteristics of a prior art clamp compared to those of a clamp of the invention.

The effect on the voltage peak is shown by comparing the voltage waveform 300 to waveform 302, in FIG. 3, for no extra capacitance and for added capacitance, respectively. Waveform 302 shows a relatively small voltage peak from just below 6 volts to just over 6 volts. In contrast, the prior art clamp permits a voltage peak that is some 25% greater than the final holding voltage 304.

The effect of the clamp can best be described with reference to the human body model (HBM) to represent ESD caused by human handling of the bipolar analog circuit. In terms of the MIL standard, the human body, when providing an ESD to a circuit, will produce a voltage peak having a rise time of approximately 10 ns and a fall time of about 150 ns.

Figure 4:
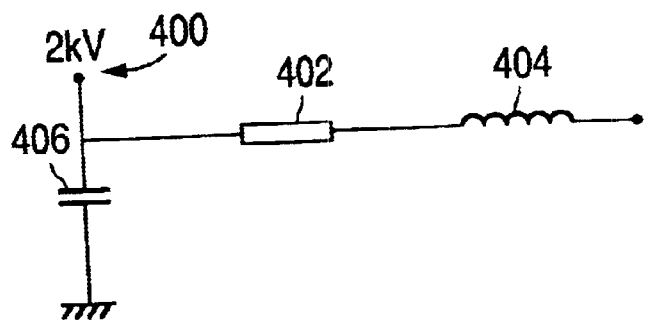
FIG. 4 is a schematic circuit diagram of a simulation circuit of the human body model.

The voltage peak generated by the human body can be represented using a simulation circuit as shown in FIG. 4. The simulation circuit includes passive components comprising approximately a 2 kV voltage source 400 connected to a 1.5 k resistor 402 in series with a small inductance 404. A 100 pF capacitor 406 is connected in parallel as shown.

Using the simulation circuit of FIG. 4 in conjunction with a physical clamp, the overvoltage caused by the transient voltage peak, and the effect of the delay time before the clamp switches can be analyzed. Using the prior art circuit of FIG. 7 in conjunction with the simulation circuit of FIG. 4, a voltage peak of approximately 25% over the median 304, due to the delay of the clamp switching, is produced, as shown in FIG. 3.

In contrast, adding the capacitor 106 in accordance with the present invention, causes the much smaller overvoltage shown by the curve 302. The width of the over voltage peak is considerably narrower than in the case of the prior art curve 300, thus exposing the attached protected circuit not only to a smaller overvoltage but doing so for a shorter period of time.

Figure 5:
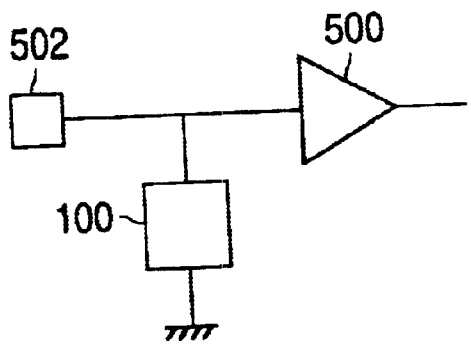
FIG. 5 is a schematic circuit diagram of a general application of the clamp of FIG. 1.

A general implementation of the clamp 100 of the invention is shown in FIG. 5. A general bipolar analog circuit to be protected is represented by amplifier 500 which is attached to a contact pad 502. The clamp 100 is connected in parallel between the input of the circuit 500 and ground.

Figure 6:
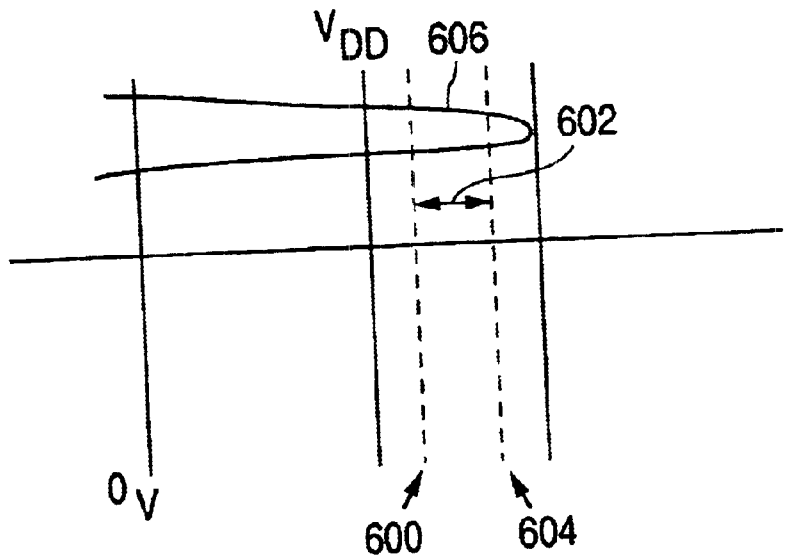
FIG. 6 is a graphical representation showing the operating window of the clamp of the invention.

It will be appreciated, that for the clamp 100 to work effectively it has to turn on before the breakdown voltage of the circuit 500 is exceeded. Furthermore, a typical circuit such as that represented by circuit 500 will have some typical operating voltage, such as 5 V, 12 V, 20 V, etc. To avoid the clamp 100 switching on under stable operating conditions, it will be appreciated that the clamp 100 must be designed to switch on only once the stable operating voltage is exceeded by some defined amount. Under stable operating conditions, the voltage to which the clamp is exposed comprises a DC bias and a signal applied to the protected circuit. The avalanche diode, in this case BJT 102, can handle only brief overvoltage pulses and would typically suffer damage if it remained in conduction under normal operating conditions. Thus the clamp 100 must be designed to switch off at a voltage above the stable operating voltage. This switching voltage, known as latchup is best illustrated by the line 600 in FIG. 6, where the latchup voltage is shown to be somewhat greater than the stable operating voltage $V_{dd}$ of the analog circuit. On the other hand, in order to protect the attached circuit against voltage transients, the clamp must turn on before the breakdown voltage of the attached circuit and must not take too long to turn on. As discussed above, the clamp 100 must switch on faster than the 10 ns rise time defined by the HBM. The clamp 100 thus has a voltage window 602, between the latchup voltage 600 and the analog circuit breakdown voltage 604 or overvoltage limit, which defines the operating range of the clamp 100. A transient input voltage peak 606, would typically exceed the overvoltage limit 604. However, the clamp 100 serves to protect the analog circuit against this overvoltage peak by switching on and remaining in conduction until the input voltage returns to a level below the latchup voltage 600.

The invention has been described with reference to a specific embodiment of a clamp. It will be appreciated that the speeding up effect of the clamp through the use of base current using a capacitor, can equally well be applied to variations of the clamp circuit.

What is claimed is:

1. An overvoltage protection circuit for protecting an input of an analog bipolar circuit comprising
   a first bipolar junction transistor having a base, a collector, and at least one emitter, connected between an input of the analog bipolar circuit and ground,
   a reverse-coupled bipolar junction transistor having a base, a collector, and at least one emitter, wherein the emitter is connected to the input, and the collector is connected to the base of the first bipolar junction transistor, and
   a capacitor connected to the base of the reverse coupled bipolar junction transistor to inject current into the base.

2. An overvoltage protection circuit comprising
   a first transistor connected as a switch for shunting current to ground,
   a reverse-coupled transistor connected to the first transistor for switching on the first transistor when the reverse breakdown voltage of the reverse-coupled transistor is exceeded, and
   a capacitor connected to the reverse-coupled transistor for lowering the reverse-breakdown voltage of the reverse-coupled transistor.

3. An overvoltage protection circuit of claim 2, wherein the first transistor is an NPN bipolar junction transistor.

4. An overvoltage protection circuit of claim 2, wherein the reverse-coupled transistor is an NPN bipolar junction transistor.

5. An overvoltage protection circuit, comprising
   a first transistor for shunting current to ground,
   a reverse-coupled transistor connected to the first transistor to force the first transistor into conduction when the reverse-coupled transistor is forced into conduction, and
   a capacitor connected to the reverse-coupled transistor to more rapidly cause the reverse-coupled transistor to conduct.

6. An overvoltage protection circuit of claim 5, wherein the capacitor causes the reverse-coupled transistor more rapidly to conduct by reducing the break-down voltage of the reverse-coupled transistor.

7. An overvoltage protection circuit of claim 5, wherein the reverse-coupled transistor is a bipolar junction transistor having a base, and wherein the capacitor causes the reverse-coupled transistor more rapidly to conduct by injecting current into the base.

8. An overvoltage protection circuit of claim 5, wherein the first transistor is a bipolar junction transistor.

9. An overvoltage protection circuit of claim 5, wherein the first transistor is a field effect transistor.

10. A method of improving an overvoltage protection circuit for an input to a protected circuit, wherein the overvoltage protection circuit includes a first transistor for shunting current to ground, and a reverse-coupled transistor connected to the first transistor to switch on the first transistor, comprising the step of lowering the reverse-breakdown voltage of the reverse-coupled transistor when a voltage transient occurs.

11. A method of claim 10, wherein the reverse-coupled transistor is a bipolar junction transistor and the step of lowering the reverse-breakdown voltage includes injecting current into the base of the bipolar junction transistor.

12. A method of claim 11, wherein the current is injected into the base by connecting a capacitor between the base and the input.

* * * * *